United States Patent
Tu et al.

(10) Patent No.: US 12,080,009 B2
(45) Date of Patent: Sep. 3, 2024

(54) MULTI-CHANNEL HIGH-QUALITY DEPTH ESTIMATION SYSTEM TO PROVIDE AUGMENTED AND VIRTUAL REALTY FEATURES

(71) Applicant: Black Sesame International Holding Limited, San Jose, CA (US)

(72) Inventors: Fangwen Tu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 480 days.

(21) Appl. No.: 17/463,188

(22) Filed: Aug. 31, 2021

(65) Prior Publication Data

US 2023/0063150 A1     Mar. 2, 2023

(51) Int. Cl.
*G06T 7/11* (2017.01)
*G06T 5/70* (2024.01)
(Continued)

(52) U.S. Cl.
CPC ............... *G06T 7/536* (2017.01); *G06T 5/70* (2024.01); *G06T 5/77* (2024.01); *G06T 7/11* (2017.01);
(Continued)

(58) Field of Classification Search
CPC ......... G06T 7/536; G06T 5/002; G06T 5/005; G06T 7/11; G06T 7/13; G06T 15/00; G06T 19/006; G06T 2200/04; G06T 2207/20081; G06T 2207/20084; G06T 2207/20192; G06T 7/50; G06T 19/00; G06T 7/0002; G06T 7/73; G06T 17/00; G06T 2207/10028; G06T 2207/30244; G06F 18/214; G06F 18/251; G06V 30/274; G06V 10/454; G06V 10/457; G06V 20/20; G06V 20/64; G06V 20/70

See application file for complete search history.

(56) References Cited

U.S. PATENT DOCUMENTS

| 8,665,258 B2 | 3/2014 | Diverdi et al. |
| 2010/0220893 A1 | 9/2010 | Lee et al. |

(Continued)

FOREIGN PATENT DOCUMENTS

WO    WO-2021097126 A1 *  5/2021  ........... G06T 19/006

OTHER PUBLICATIONS

K. Wang et al. "MVDepthNet: Real-time Multiview Depth Estimation Neural Network," Jul. 23, 2018, 2018 International Conference on 3D vision (Year: 2018).*

(Continued)

*Primary Examiner* — Bernard Krasnic
(74) *Attorney, Agent, or Firm* — Timothy T. Wang; Ni, Wang & Massand, PLLC

(57) ABSTRACT

The present invention discloses a system and a method for providing multi-channel high-quality depth estimation from a monocular camera for providing augmented reality (AR) and virtual reality (VR) features to an image. The invention further includes the method to enhance generalization on deployment-friendly monocular depth inference pipeline with semantic information. Furthermore, a vivid and intact reconstruction is guaranteed by inpainting the missing depth and context within the single image input.

16 Claims, 8 Drawing Sheets

(51) Int. Cl.
*G06T 5/77* (2024.01)
*G06T 7/13* (2017.01)
*G06T 7/536* (2017.01)

(52) U.S. Cl.
CPC ...... *G06T 7/13* (2017.01); *G06T 2207/20081* (2013.01); *G06T 2207/20084* (2013.01); *G06T 2207/20192* (2013.01)

(56) References Cited

U.S. PATENT DOCUMENTS

| | | | |
|---|---|---|---|
| 2020/0082219 A1* | 3/2020 | Li | G06V 20/56 |
| 2020/0334894 A1* | 10/2020 | Long | G06T 13/00 |
| 2023/0099521 A1* | 3/2023 | Yang | G06F 18/254 |
| | | | 382/173 |

OTHER PUBLICATIONS

F. Tosi et al. "Learning monocular depth estimation infusing traditional stereo knowledge," Apr. 8, 2019, IEEE (Year: 2019).*

* cited by examiner

MULTI-CHANNEL HIGH-QUALITY DEPTH ESTIMATION SYSTEM TO PROVIDE AUGMENTED AND VIRTUAL REALTY FEATURES

FIELD OF INVENTION

The present invention generally relates to mono-view depth estimation. More specifically, the present invention relates to multi-channel high-quality depth estimation from a monocular camera for providing augmented reality (AR) and virtual reality (VR) features to an image.

BACKGROUND

In mono-view depth estimation, depth may be obtained from the monoscopic spatial labelled temporal domain. The term "monoscopic" or "mono" is used to refer to a characteristic in which the left and right eyes see the same perspective view of a given scene. One of the known mono-view depth estimation methods is performed by extracting the depth information from the degree of object motion and is thus called a depth-from-motion method.

The object with a higher degree of motion is assigned smaller depth and vice versa. Another one of the conventional mono-view depth estimation methods is performed by assigning larger depth to non-focused regions such as the background and is thus called a depth-from-focus-cue method.

A further conventional mono-view depth estimation method is performed by detecting the intersection of vanishing lines, or vanishing points. The points approaching the vanishing point are assigned larger (or farther) depth and vice versa. The drawback with the conventional methods, however, is that very limited information may be obtained from the monoscopic spatio-temporal domain. Thus, the conventional methods, unfortunately, cannot solve all of the scene-contents in a real-world image.

A US application 20100220893 assigned to Himax Technologies Ltd. discloses a system and a method relating to mono-view depth estimation. The invention provides a ground model method and system for mono-view depth estimation, which is capable of providing correct and versatile depth and handling of a relatively large (i.e., great) variety of scenes whenever a depth diffusion region (DDR) is present or can be identified. The described technology in the invention breaks the image into different entities and assigns depth to each entity. The invention provides depth estimation to an image, however, it lacks in providing texture, colour, and depth information to the occluded regions that may come up during the process of depth estimation.

Another U.S. Pat. No. 8,665,258B2 assigned to Adobe Systems Inc. is directed generally to digital image processing, and more particularly to the generation of a depth map from a single image. The technology disclosed in the patent is more advanced than the prior application by providing a depth map for the image data which is automatically determined subject to one or more depth constraints. Moreover, representation of the depth map which can be displayed on the computer display. The prior art, however, predicts depth using a single image and does not takes into consideration pre-stored images and the internal parameters of the camera of electronic devices for identifying objects and labelling them. Hence, there is a great chance of leaving the unidentified object unlabelled with no depth pattern introduced.

Therefore, to overcome the drawbacks mentioned in the above-mentioned prior arts, a high-quality depth estimation system is proposed. The high-quality depth estimation system of the invention provides a depth estimation system for providing a Three dimensional reconstruction of an image before adding Artificial Reality or Virtual Reality features to the image.

Thus, it is apparent now that numerous methods and systems are developed in the prior art that is adequate for various purposes. Furthermore, even though these inventions may be suitable for the specific purposes to which they address, accordingly, they would not be suitable for the purposes of the present invention as heretofore described. Thus, there is a need for a high-quality depth estimation system of the invention provides a depth estimation system for providing a three dimensional reconstruction of an image before adding AR Ot VR features to the image.

SUMMARY OF THE INVENTION

Three dimensional photography that can record a scene in a dynamic way is a fascinating function compared to the traditional three dimensional image. These photos make the images to become more realistic by embedding depth into the image and present a novel view with calculated ordinals. The Three dimensional effects come to user's front when they move their portable devices or simply click with the mouse. On the basis of three-dimensional images, Artificial Reality (AR) or Virtual Reality (VR) applications can be added with vivid multi-view presentations.

The primary objective of the present invention is to introduce a system that requires a single image capturing device to produce Three dimensional reconstruction and other AR or VR visual features for any display terminals including PC, mobile phones and wearable devices. The invention introduces a system that employs multiple perspective features to facilitate the generation of dense and pixel-level high-quality depth estimation.

Another objective is to introduce a depth estimation module to predict the depth using a single image. Different internal camera parameters result in different fields of view, distortion, and image layouts. These variations bring additional challenges for a single network to handle. During training, a batch of images and GT depth are imported into the network to extend the data source range. Moreover, the additional module is designed to handle the internal parameters of different camera types. Both GT depth and internal parameters are subject to some normalization operation before feeding into the network. Edge alignment techniques are introduced to remove any edge discontinuities and displacements that may arise during depth estimation.

The depth estimated by the monocular depth estimation module will inevitably contain unreasonable depth regions such as the uneven depth distribution within a homogeneous surface, loss of depth gradient within a depth gradual variation area. Another objective is to present a panoptic segmentation unit to obtain the semantic labels of each entity in the given image. A dictionary outputs the corresponding depth pattern within each instance.

In case there are low confidence regions in the image, i.e. regions for which the semantic label cannot be produced, a vanishing point is used to smooth the overall depth map by keeping these low confidence points in correct ordinal order complying with the vanishing point or depth layouts.

Yet another objective of the present invention is to perform the inpainting operation on the image after smoothening both the labelled and unlabelled entities in the image. A semantic edge detector is described to detect actual semantic edges which include occlusions and request inpainting. The Inpainting operation detects the occluded areas and adds colour, texture, and depth information to the occluded areas.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION

Three-dimensional image displays have become gradually popular over time, and requirements for three dimensional image data are gradually higher. However, most of image data is still two-dimensional (2D) data. When an original 2D image is converted into a three dimensional image, image depth is an important parameter in the conversion. The image depth refers to a distance from a view point to an object in the image, and can be used to generate two somewhat different images on the left and right for a left eye and a right eye to watch respectively, so that a user has a feel of watching a three dimensional image by taking advantage of parallax between the eyes. However, since the algorithm is very complex, real time 2D-to-three dimensional image conversion is very difficult. Therefore, how to rapidly obtain a parameter, for example, a depth value of each pixel in the image, required by the 2D-to-three dimensional image conversion is an important topic.

In the conventional technology, in some methods, depth value estimation is accelerated by using information among frames. For example, the depth value is estimated by using an object moving distance in successive frames of a video film. However, a scene or main object in the image changes or rapidly moves, the depth value of each pixel is not easy to be accurately estimated. Moreover, when a front and back relation of the object in the image is indefinite, for example, a front object masking a back object does not exist, the image depth estimation is also difficult.

An input device provides or receives one or more two-dimensional (2D) input images to be processed in accordance with the embodiment of the present invention. The input device may in general be an electro-optical device that maps three dimensional object(s) onto a 2D image plane by prospective projection. In one embodiment, the input device may be a still camera that takes the 2D image, or a video camera that captures a number of image frames.

The input device, in another embodiment, may be a pre-processing device that performs one or more of digital image processing tasks, such as image enhancement, image restoration, image analysis, image compression or image synthesis. Moreover, the input device may further include a storage device, such as a semiconductor memory or hard disk drive, which stores processed images from the pre-processing device.

Figure 1A:
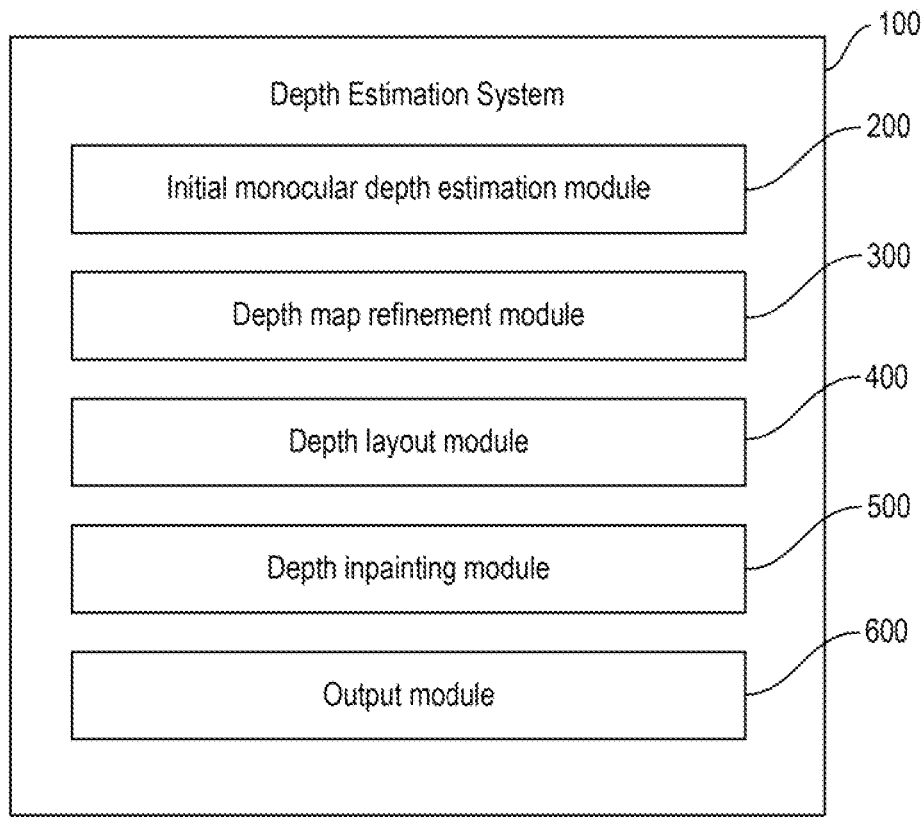
FIG. 1A illustrates a system for providing monocular CNN based depth estimation in accordance with the present invention.

FIG. 1A illustrates a depth estimation system for a captured image in accordance with the present invention. The depth estimation system 100 of the invention includes an initial monocular depth estimation module 200 that receives an image and improves the quality of depth within the image with the help of a predictor unit configured within the monocular depth estimation module. The predictor unit predicts the depth of the image on the basis of a plurality of pre-stored images and a number of internal parameters of cameras of electronic devices that are imported into a prediction pipeline. Different internal camera parameters result in different FOV, distortion and image layouts. These variations bring additional challenging for a single network to handle.

An additional module is designed to handle the internal parameters of different camera types. Both GT depth and internal parameters are subject to some normalization operation before they are fed into the network. In this manner, the inference system will not only consider the image layout with the RGB (Red green blue) input but consider the relative scale brought by the involved camera parameters.

The initial monocular depth estimation module 200 further includes an edge alignment quality unit. The edge alignment quality unit removes a plurality of edge discontinuities in the depth by introducing a semantic head. This semantic head does not bring computational burden to computation unit because it gets abandoned during inference.

Restricted by the model regression capability and availability of training data, the depth estimated by the monocular depth estimation module inevitably contains unreasonable depth regions such as the uneven depth distribution within a homogeneous surface, loss of depth gradient within a depth gradual variation area. In this regard, a depth map refinement module is proposed by the invention which performs a refinement of the aligned image.

The depth map refinement module 300 includes a panoptic segmentation unit to obtain the semantic labels of each entity in the scene. With these labelled objects, the system is able to fit different depth pattern models for each class under the guidance of prior knowledge. For example, as for the sky, the depth is usually farthest among the scene, as for ground, as gradually increasing depth is a proper pattern, for humans, a uniform depth is suitable in most cases.

The panoptic segmentation unit produces the semantic labels for those objects which have a depth pattern model. A dictionary unit configured within depth map refinement module outputs a corresponding depth pattern within in each instance. For example, the ground area, the depth should be gradually increased from near towards far, e.g. the depth distribution should be evenly increased instead of sudden change.

A vanishing point in a scene usually helps to indicate the depth variation trend. In the depth map, there are still some low confidence points with respect to depth value. The points usually do not belong to any semantic labels or unrecognized with any class. A depth layout module 400 includes one or more vanishing points to indicate the depth variation patterns to facilitate depth map for providing one or more depth patterns to one or more unrecognized semantic labels in the segmented image.

The vanishing points or even a depth layout prediction (e.g. indoor scene depth layouts following Manhattan Assumption) can be used to smooth the overall depth map by keeping these unlabelled points in correct ordinal order complying with the VP or depth layouts. This operation can be seen as a global smoothness of the depth map while the semantic label refinement in the last section acts as a local smoothness operation.

Ahead of the rendering of three dimensional image and AR OR VR features, an inpainting operation is required for single image input which is performed by a depth inpainting module 500. For the occluded regions within the image, an inpainting operation that can compensate the color, texture and depth information is needed. A semantic edge detector is proposed to perform inpainting operation in the present invention.

The semantic edge detects the actual semantic edges which include occlusions and request inpainting. An output module 600 produces a three dimensional scene reconstruction of the inpainted image and adding a plurality of augmented reality and virtual reality features to the inpainted image to generate a three dimensional image.

Figure 1B:
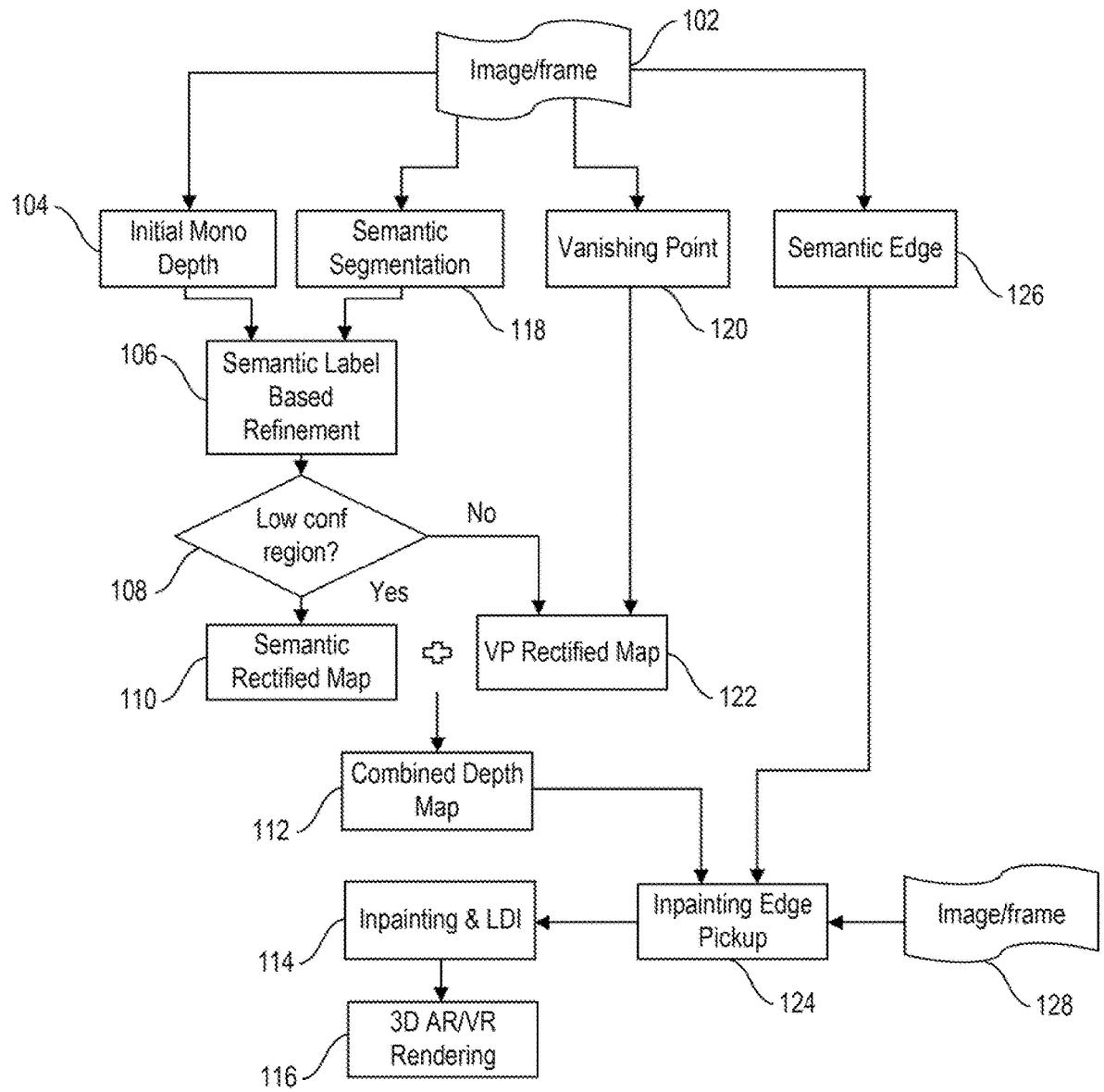
FIG. 1B illustrates a workflow representation of the depth estimation system in accordance with the present invention.

FIG. 1B illustrates the depth estimation system in accordance with the present invention. The image at hand may be taken as a whole image 102 or may be divided into multiple frames 102. In the primary embodiment, the image is taken as a whole. As shown, the depth estimation module predicts the depth using a single image. The outcome acts as an initial input to the following refinement and inpainting pipelines. Thus, the quality of the depth is essential to the final rendering performance.

Generally speaking, apart from a reasonable depth distribution, two more factors are also significant to the quality as well as the practice usage. An edge alignment quality unit removes the edge discontinuities within the image. A semantic head able to predict tasks such as semantic mask, semantic edges, etc. is introduced.

The depth estimated by the monocular depth estimation module 104 contains unreasonable depth regions such as the uneven depth distribution within a homogeneous surface and loss of depth gradient within a depth gradual variation area. In this regard, a panoptic segmentation unit configured within the depth map refinement module is proposed to obtain the semantic labels of each entity in the image. The segmentation 118 of the image into different entities by the segmentation module is referred to as semantic label based refinement 110. A dictionary unit is responsible for defining depth patterns for different entities of the image to form a combined depth map 110.

In case there are entities in the image that can't be labelled, also referred to as low confidence regions, a vanishing point rectified map consisting of a number of vanishing points 120 act on the image and perform a global smoothness operation on the image which helps provide depth estimation to the unlabelled entities also. This includes combining a semantic rectified map with a VP rectified map as shown to generate a combined depth map.

On the other hand, if there are no low confidence regions 108 identified in the image, a semantic rectified map or VP rectified map 122 is enough for providing depth estimation to the entire image at once. A semantic edge detector 126 detects actual semantic edges which include occlusions and request inpainting operation to be performed on the image 128. Finally, the inpainted image 124 is taken combined with LDI 114 and AR OR VR features 116 are added to the image.

Figure 2A:
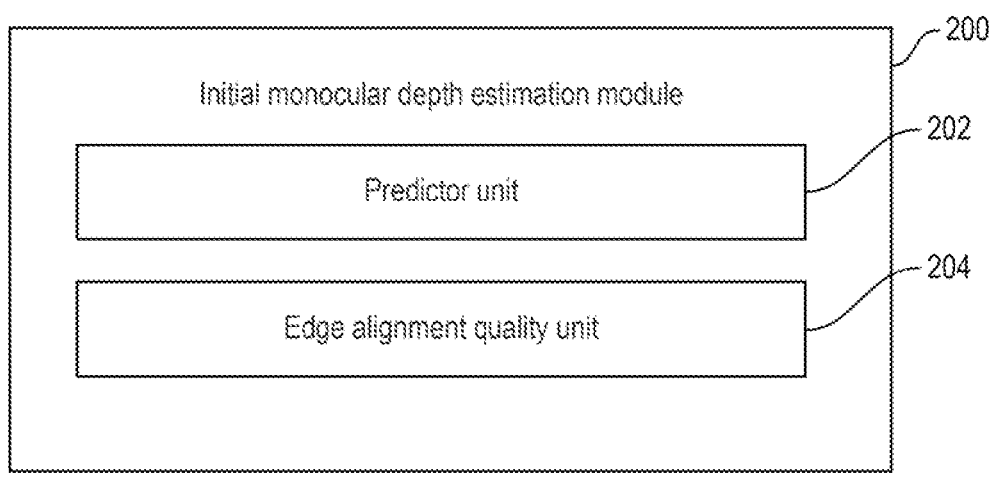
FIG. 2A illustrates an initial monocular depth estimation module within the depth estimation system in accordance with the present invention.

FIG. 2A illustrates an initial monocular depth estimation module within the depth estimation system. The initial monocular depth estimation module 200 includes a predictor unit 202 that predicts the depth using a single image. The predictor unit of the depth estimation module predicts the depth using a single image. The outcome will act as an initial input to the following refinement and inpainting pipelines.

Thus, the quality of the depth is essential to the final rendering performance. Generally speaking, apart from a reasonable depth distribution, two more factors are also significant to the quality as well as the practice usage. The two factors are (1) Generalization capability with various input images of different camera parameters, and (2) edge alignment quality with a semantic level of objects.

As for the generalization capability, it is known that different internal camera parameters will result in different FOV, distortion, and image layouts. These variations bring additional challenges for a single network to handle. Traditionally, fine-tuning with target camera-input images are required to solve this problem. In this invention, the camera internal parameters such as focal length, principal centres are employed within the prediction pipeline. These parameters are imported as input along with a batch of other images and GT depth.

By mentioning edge alignment quality which is to be performed by the edge alignment quality unit 204, we indicate if the depth is tightly consistent with the actual object edges without any transitional regions. On the contrary, it is also not reasonable if the depth has discontinuity at every edge region since these edges can be either context edge where no depth jump exists or actual object's edge which contains necessary depth discontinuity.

In order to handle this problem, a semantic head is proposed during the training to consider semantic objects. The semantic head is able to predict tasks such as semantic mask, semantic edges and etc. This additional head will not bring a computational burden to the computation unit because it will be abandoned during inference. But the semantic information that this head has already learned will be implicitly reserved in the remaining pipeline.

Figure 2B:
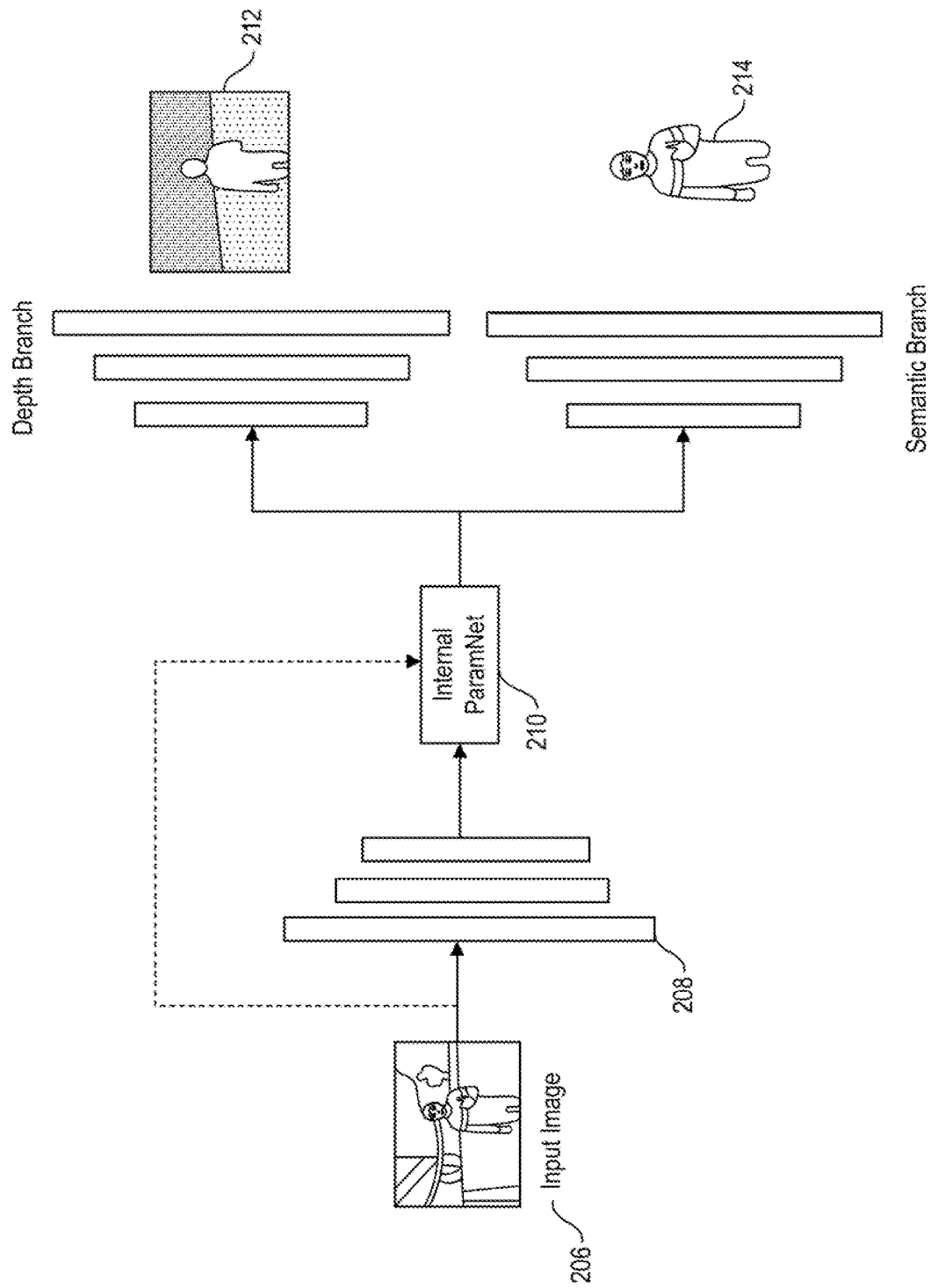
FIG. 2B illustrates the workflow representation with the initial monocular depth estimation module in accordance with the present invention.

FIG. 2B illustrates the initial monocular depth estimation module in accordance with the present invention. The input image 206 is divided into a number of frames 208 in the present embodiment of the invention. It is known that different internal camera parameters 210 will result in different FOV, distortion, and image layouts. These variations bring additional challenges for a single network to handle. Traditionally, fine-tuning with target camera-input images was required to solve this problem. In this invention, internal parameters such as focal length, principal centres are imported within the prediction pipeline. These parameters are imported as input.

During training, a batch of images and GT depth are imported into the network to extend the data source range. Moreover, the additional module is designed to handle the internal parameters of different camera types. Both GT depth and internal parameters are subject to some normalization operation before feeding into the network. In this manner, the inference system will not only consider the image layout with the RGB input but consider the relative scale brought by the involved camera parameters.

The depth prediction by the depth estimation module may result in images having unreasonable depth regions forming depth branch 212. A semantic head is introduced during the training to consider semantic objects forming the semantic branch 214. The semantic head is able to predict tasks such as semantic mask, semantic edges and etc. This additional head will not bring a computational burden to the computation unit because it will be abandoned during inference.

Figure 3A:
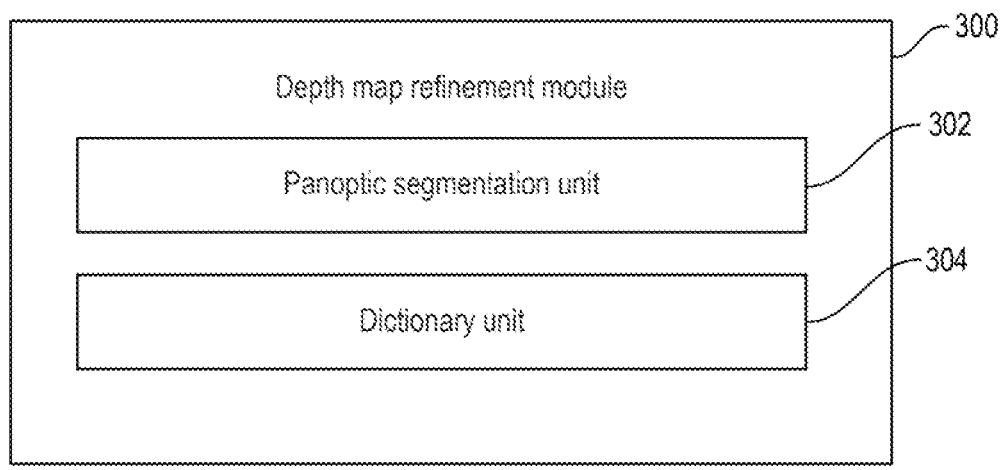
FIG. 3A illustrates a depth map refinement module within the depth estimation system in accordance with the present invention.

FIG. 3A illustrates a depth map refinement module within the depth estimation system. The depth map refinement module 3M) comprises a panoptic segmentation unit 302 and a dictionary unit 304. The panoptic segmentation unit 302 obtains the semantic labels of each entity in the scene. With these labelled objects, the depth map refinement module is able to fit different depth pattern models for each class under the guidance of prior knowledge. For example, as for the sky, the depth is usually farthest among the scene, as for ground, as gradually increasing depth is a proper pattern, for humans, a uniform depth is suitable in most cases.

The panoptic segmentation unit 302 produces the semantic labels for those objects that have a depth pattern model. Then, the dictionary unit 304 outputs the corresponding depth pattern within each instance. For those who have a depth variation pattern, the parameters such as minimum-maximum depth, distribution variance can be determined with the guidance of the estimated depth map from the last module. For example, in the ground area, the depth should be gradually increased from near towards far, e.g. the depth distribution should be evenly increased instead of sudden change. In this manner, a reasonable depth will be derived by considering the depth essence of each semantic class.

Figure 3B:
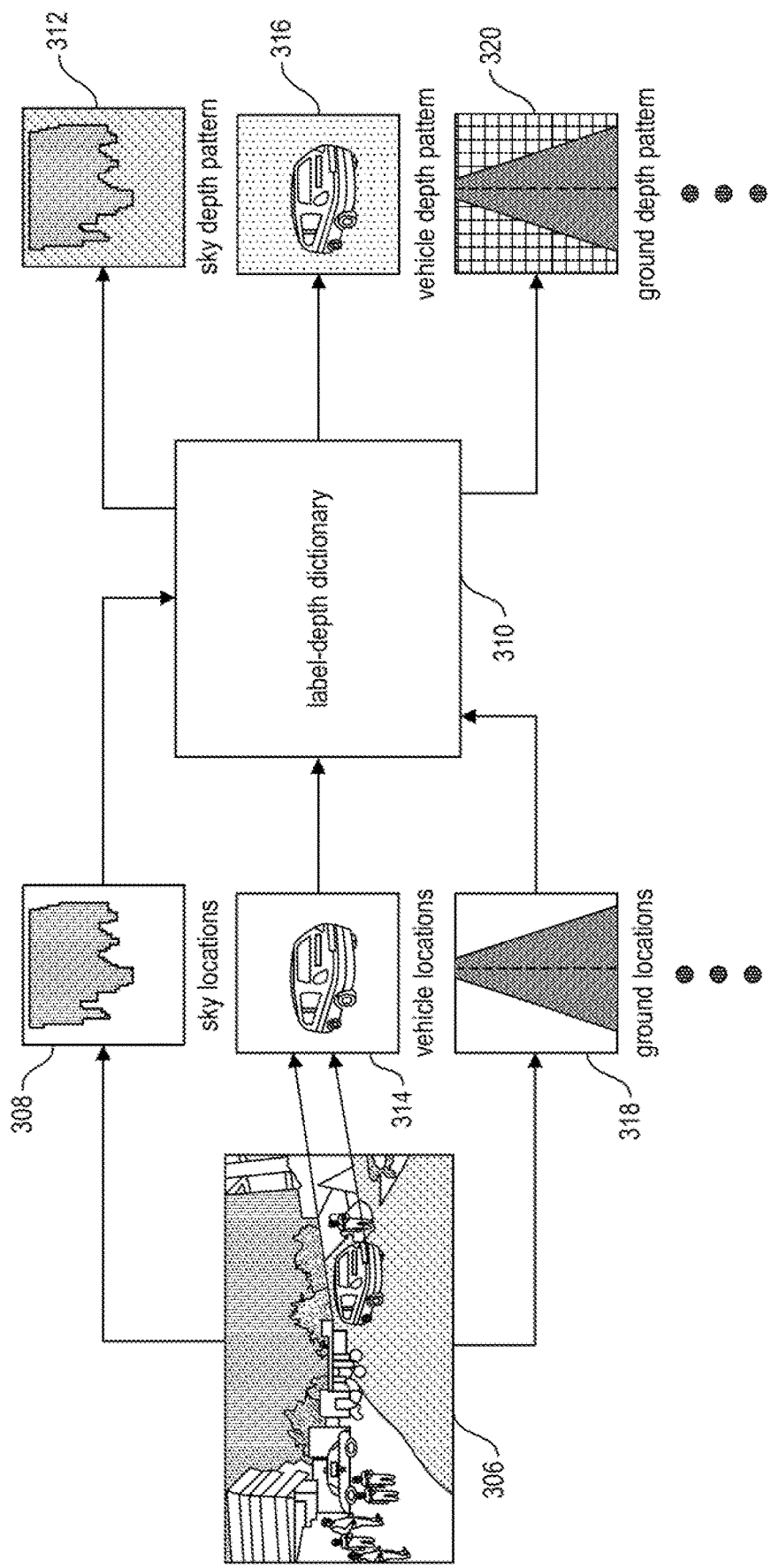
FIG. 3B illustrates the workflow representation of refinement with the depth map refinement module in accordance with the present invention.

FIG. 3B illustrates the depth map refinement module in accordance with the present invention. Image 306 in FIG. 3b shows a street view with different objects or entities such as road, public, sky, vehicles, etc. Sky locations 308, ground locations 314, and vehicle locations 318 have been specifically marked as shown in FIG. 3b. A label-depth dictionary 310 provides depth patterns to the mentioned entities. As shown, sky location 312, vehicle location 316, and ground location 320 have been assigned corresponding depth patterns by the label-depth dictionary.

Figure 4:
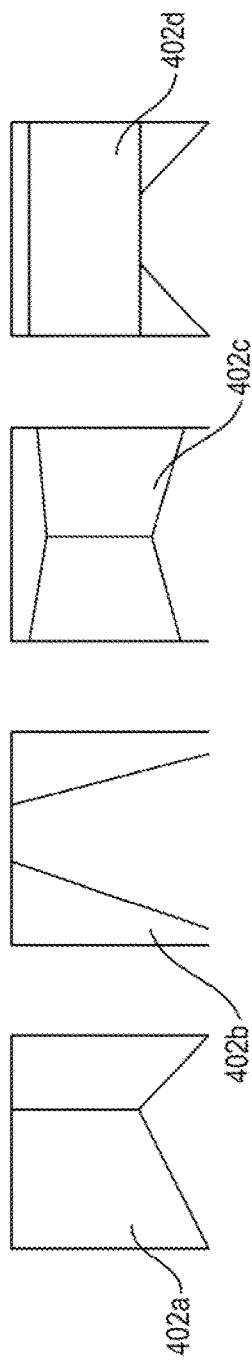
FIG. 4 illustrates space layout patterns in accordance with the present invention.

FIG. 4 illustrates space layout patterns in accordance with the present invention. The vanishing point or even a depth layout prediction (e.g. indoor scene depth layouts following Manhattan Assumption) can be used to smooth the overall depth map by keeping these unlabeled points in correct ordinal order complying with the VP or depth layouts. Some of space typical layout patterns like 402a, 402b. 402c and 402d.

Figure 5:
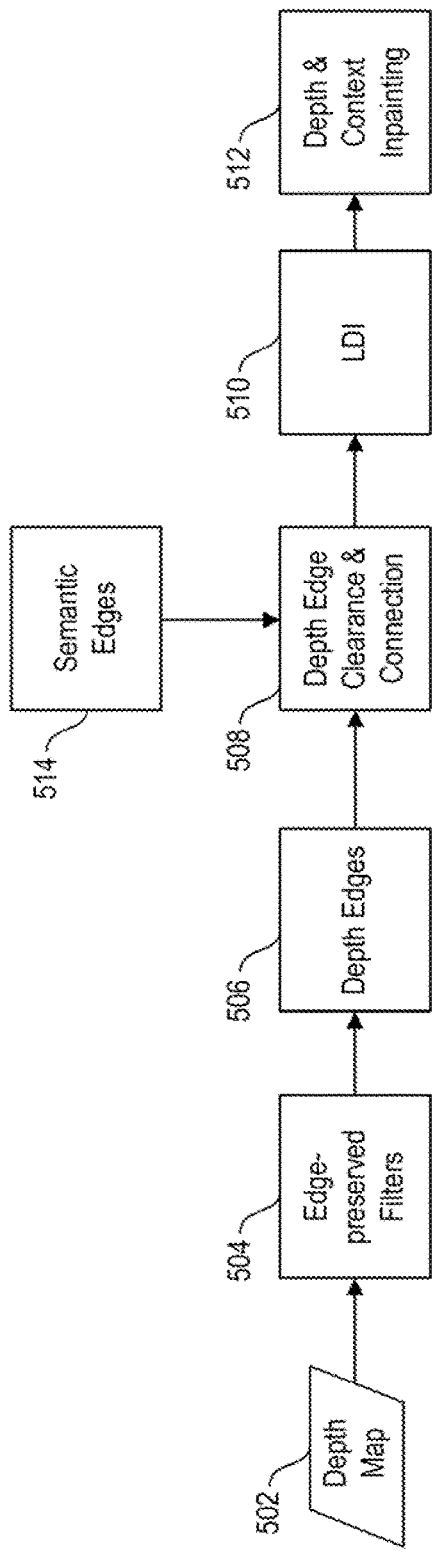
FIG. 5 illustrates a semantic edge guided inpainting workflow in accordance with the present invention.

FIG. 5 illustrates a semantic edge guided inpainting workflow in accordance with the present invention. A depth map 502 is generated by the depth estimation module and depth map refinement module, the generated depth map will pass an edge-preserved filter 504 before the depth discontinuous edges 506 can be determined, a semantic edge detector fusion scheme 508 to solve this problem. The semantic edge will facilitate to detect of the actual semantic edges 514 which include occlusions and request inpainting.

Moreover, the spurious depth edges can be removed to increase the inpainting speed. Based on the fused depth edge detection an initial Layered Depth Image (LDI) 510 is able to be created and inpainting can be conducted based on the local context 512 similarities or other learning-based methods.

Figure 6:
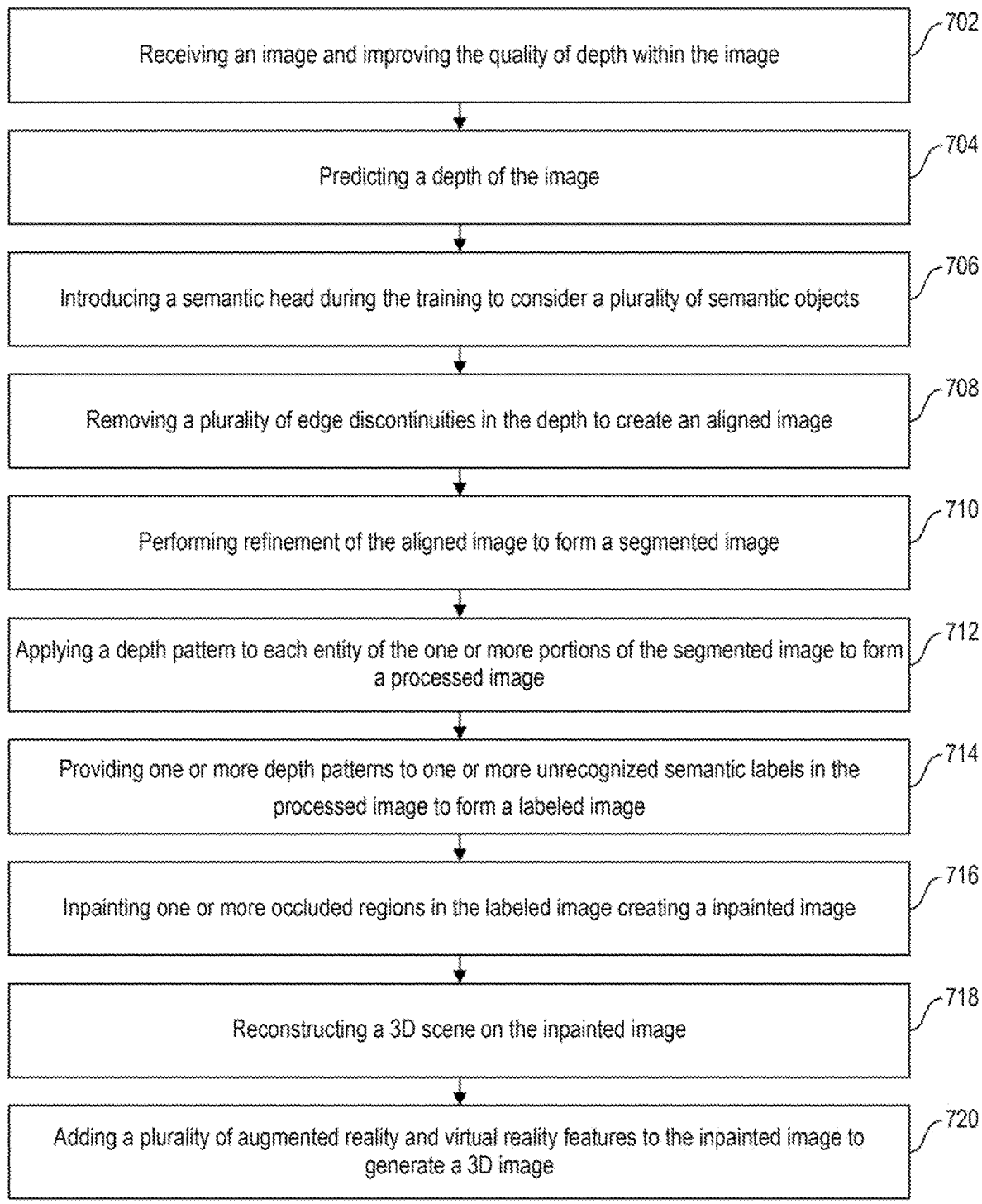
FIG. 6 illustrates a method for providing monocular CNN based depth estimation in accordance with the present invention.

FIG. 6 illustrates a method for providing monocular CNN-based depth estimation. The method includes receiving an image and improving the quality of depth within image 702 by the depth estimation system in step. The depth estimation module of the system then predicts the depth of the image 704 in step with the help of training data that includes pre-stored images and a number of internal parameters of the camera such as FOV, principal centres, etc. Next, the depth map refinement unit of the depth estimation system which includes a panoptic segmentation unit introduces a semantic head to consider semantic objects 706. The semantic head is able to predict tasks such as semantic mask, semantic edges and etc.

Further, in the next step, edge discontinuities in the image are removed from the estimated depth in the image to create an aligned image 708. Next, in step, the panoptic segmentation unit performs refinement of the aligned image to form a segmented image 710 by classifying the image into different entities such as sky location, vehicle location, etc. The dictionary unit of the depth map refinement unit then assigns a depth pattern to each entity of the image in step 712. Next, a depth map is generated for providing the depth patterns to form a labelled image in step 714. This depth map includes a VP rectified map in case there are low confidence regions within the image even after labelling the different entities of the image.

After the depth map is generated, in step, the occluded regions of the image that lack proper colour, depth information, and texture are inpainted to form an inpainted image 716. Next, a Three dimensional scene is reconstructed on the inpainted image in step 718. Finally, a number of augmented reality and virtual reality features are added to the inpainted image to generate a Three dimensional image 720.

While the various embodiments of the present invention have been described above, it should be understood that they have been presented by way of example only, and not of limitation. Likewise, the figure may depict an example of architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A multi-channel convolution Neural network (CNN) based depth estimation system for a monocular camera, wherein the depth estimation system comprising:
    a monocular depth estimation module, wherein the monocular depth estimation module comprising:
        a predictor unit for predicting depth in a single image based on pre-stored images and one or more parameters of the monocular camera; and
        an edge alignment quality unit for removing edge discontinuities in the depth of the image by introducing a semantic head during a training to consider semantic objects to generate an aligned image;
    a depth map refinement module, wherein the depth map refinement module comprising:
        a panoptic segmentation unit for applying one or more semantic labels to one or more portions of the aligned image to generate a segmented image; and
        a dictionary unit for applying a depth pattern to each of the one or more portions of the segmented image based on the one or more semantic labels to generate a processed image;
    a depth layout module, wherein the depth layout module facilitates the depth map refinement module by providing a depth pattern to one or more unrecognized semantic labels in the processed image to form a labelled image;
    a depth inpainting module, wherein the depth inpainting module imprints one or more occluded regions in the labelled image to generate an inpainted image; and
    an output module, wherein the output module adds a plurality of augmented reality and virtual reality features to the inpainted image to produce a three-dimensional image.

2. The depth estimation system in accordance with claim 1, wherein the one or more parameters include focal length, principal centers within a prediction pipeline.

3. The depth estimation system in accordance with claim 2, wherein the pre-stored images and the one or more parameters are imported in the prediction pipeline.

4. The depth estimation system in accordance with claim 3, wherein the pre-stored images and the one or more parameters constitute a training data.

5. The depth estimation system in accordance with claim 1, wherein the edge alignment quality unit introduces the semantic head for removing the plurality of edge discontinuities to create the aligned image.

6. The depth estimation system in accordance with claim 1, wherein the panoptic segmentation unit generates the semantic labels for one or more portions with a depth pattern model.

7. The depth estimation system in accordance with claim 1, wherein a depth map includes one or more vanishing points to indicate depth variation patterns.

8. The depth estimation system in accordance with claim 1, wherein the one or more unrecognized labels are kept in an ordinal order.

9. The depth estimation system in accordance with claim 1, wherein the depth inpainting module includes a semantic edge detector.

10. The depth estimation system in accordance with claim 9, wherein the semantic edge detector detects a plurality of semantic edges.

11. The depth estimation system in accordance with claim 9, wherein the semantic edge detector allows an increased inpainting speed.

12. The depth estimation system in accordance with claim 9, wherein the semantic edge detector includes a fusion mechanism to detect the semantic edges based on occlusions.

13. The depth estimation system in accordance with claim 1, wherein the depth map refinement module performs a local smoothness operation.

14. The depth estimation system in accordance with claim 1, wherein the depth layout module performs as a global smoothness operation.

15. A method of depth estimation for a monocular camera based on multi-channel convolution Neural network (CNN), wherein the method comprising:
    receiving a single image and improving a quality of depth within the image;
    predicting a depth of the image on the basis of pre-stored images and one or more parameters;
    removing a plurality of edge discontinuities in the depth by introducing a semantic head during a training to consider one or more semantic objects to create an aligned image;
    performing refinement of the aligned image by obtaining one or more semantic labels for one or more portions of the aligned image to form a segmented image;
    applying a depth pattern to each entity of the one or more portions of the aligned image based on the one or more semantic labels to generate a processed image;
    providing one or more depth patterns to one or more unrecognized semantic labels in the processed image to form a labelled image;
    inpainting one or more occluded regions in the labelled image creating an inpainted image;
    reconstructing a three dimensional scene on the inpainted image; and
    adding a plurality of augmented reality and virtual reality features to the inpainted image to generate a three dimensional image.

16. A depth estimation system for monocular camera, wherein the system comprising:
- a monocular depth estimation module, wherein the monocular depth estimation unit comprising:
  - a predictor unit for predicting a depth of a single image on the basis of pre-stored images and one or more internal parameters, wherein the pre-stored images and the one or more internal parameters are imported into a prediction pipeline; and
  - an edge alignment quality unit for removing edge discontinuities in the depth by introducing a semantic head during a training to consider semantic objects to generate an aligned image;
- a depth map refinement module, wherein the depth map refinement unit comprising:
  - a panoptic segmentation unit for obtaining one or more semantic labels for one or more portions of the aligned image to form a segmented image; and
  - a dictionary unit for applying a depth pattern to each portion of the one or more portions in the segmented image based on the one or more semantic labels to generate a processed image;
- a depth layout module, wherein the depth layout module includes one or more vanishing points to indicate depth variation patterns to facilitate depth map refinement module for providing depth patterns to one or more unrecognized semantic labels in the processed image, further wherein one or more unrecognized labels are kept in a correct ordinal order to form a labelled image;
- a depth inpainting module, wherein the depth inpainting module comprises a semantic edge detector for inpainting one or more occluded regions in the labelled image creating an inpainted image and removing one or more spurious depth edges to increase an inpainting speed; and
- an output module, wherein the output module produces a three dimensional scene reconstruction of the inpainted image and adding a plurality of augmented reality and virtual reality features to the inpainted image to generate a three dimensional image.

* * * * *